United States Patent
Hargis et al.

(10) Patent No.: US 6,295,905 B1
(45) Date of Patent: *Oct. 2, 2001

(54) TOOLHOLDER WITH A REMOVABLE HEAD

(75) Inventors: John D. Hargis, Cottontown; Mark G. Charleton, Hermitage; Lawrence A. Ballew, LaVergne; Fred E. Chaffin, Lebanon; Clifford M. Garcia, Antioch, all of TN (US)

(73) Assignee: Peterson Tool Company, Nashville, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,588

(22) Filed: Dec. 18, 1998

(51) Int. Cl.[7] .................................................. B23B 29/00
(52) U.S. Cl. ................................ 82/161; 82/158; 407/81; 407/86
(58) Field of Search ............................. 82/161, 137, 154, 82/153, 158, 117, 115; 407/81, 82, 83, 87, 88

(56) References Cited

U.S. PATENT DOCUMENTS

| 356,709   | * | 1/1887  | Cross ........................... 82/161 X |
| 602,449   | * | 4/1898  | Hill ................................. 82/161 |
| 2,136,091 | * | 11/1938 | Tiefenbacher ................. 407/81 |
| 2,364,320 |   | 12/1944 | Schlitters . |
| 2,897,579 | * | 8/1959  | Novkov ........................ 82/161 X |
| 2,903,781 |   | 9/1959  | Hudson . |
| 3,376,771 | * | 4/1968  | Barnes .......................... 82/161 |
| 3,546,759 |   | 12/1970 | Sirola . |
| 3,555,943 | * | 1/1971  | Papp ............................. 82/158 |
| 3,566,723 | * | 3/1971  | Oborne .......................... 82/158 |
| 4,080,854 | * | 3/1978  | Peterson ....................... 407/88 |
| 4,389,144 |   | 6/1983  | Sipos . |
| 4,422,356 |   | 12/1983 | Pertle . |
| 4,520,701 | * | 6/1985  | Watamura ..................... 82/154 |

(List continued on next page.)

FOREIGN PATENT DOCUMENTS

| 0235333   | * | 6/1911  | (DE) ............................ 82/161 |
| 0404096   | * | 11/1909 | (FR) ............................ 82/161 |
| 2300-645  | * | 10/1976 | (FR) ............................ 82/161 |

OTHER PUBLICATIONS

U.S. application No. 09/016,472, Peterson, et al., filed Jan. 30, 1998.
U.S. application No. 09/104,571, Peterson, et al., filed Jun. 25, 1998.

(List continued on next page.)

*Primary Examiner*—Henry Tsai
(74) *Attorney, Agent, or Firm*—Waddey & Patterson; Lucian Wayne Beavers

(57) ABSTRACT

A toolholder apparatus is provided for holding a cutting tool adjacent a rotating workpiece. The apparatus includes a mounting block base and a mounting block body slidably supported on the base. A first adjustable connector connects the body to the base so that a position of the body on the base can be adjusted in a first direction toward the workpiece. A center adjustment block slidably engages the body. A second adjustable connector connects the center adjustment block and the body so that a position of the center adjustment block on the body can be adjusted in a second direction transverse to the first direction and transverse to the rotational axis of the workpiece. A head is detachably mounted on the center adjustment block. The head is removable from the center adjustment block by sliding movement in a third direction transverse to both of the first and second directions. A cutting tool support is attached to the head so that the head and the cutting tool may be removed from the apparatus to replace the cutting tool and then the head and replacement cutting tool may be remounted on the apparatus.

8 Claims, 2 Drawing Sheets

U.S. PATENT DOCUMENTS

| | | |
|---|---|---|
| 4,631,994 | 12/1986 | Jester et al. . |
| 4,750,392 | 6/1988 | Hong . |
| 4,879,930 | 11/1989 | Von Haas . |
| 5,551,795 * | 9/1996 | Engibarov .............................. 82/158 |

OTHER PUBLICATIONS

Exhibit A—Drawing of a clamp rod and dovetail type carrier block (the contents of which are admitted to be prior art).

Exhibit B—Kennametal brochure (undated but admitted to be prior art).

Exhibit C—Valenite brochure (undated but admitted to be prior art).

Exhibit D—a SOMMA brochure (undated but admitted to be prior art).

Exhibit E—brochure of The Langolf Company (undated but admitted to be prior art).

* cited by examiner

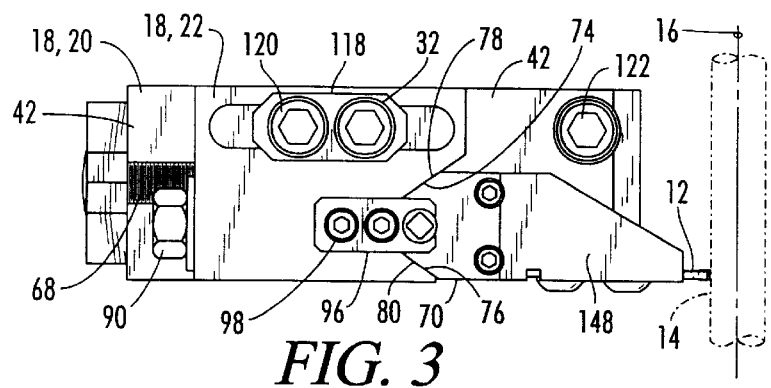
FIG. 3
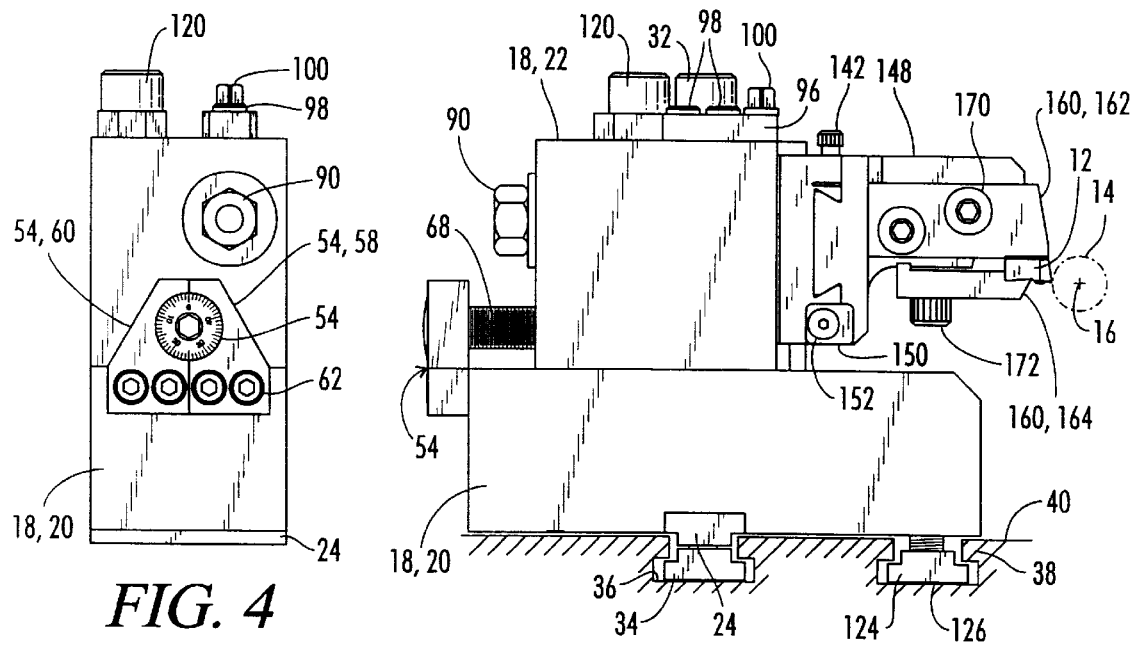
FIG. 4
FIG. 2
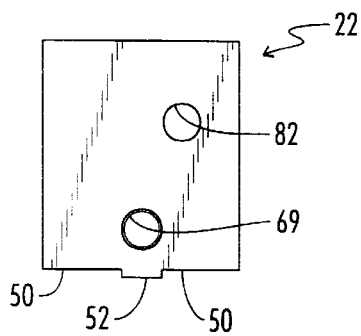
FIG. 5
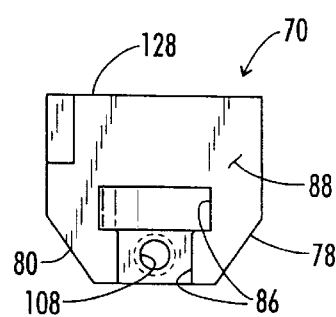
FIG. 6

TOOLHOLDER WITH A REMOVABLE HEAD

BACKGROUND OF THE INVENTION

1. Field of the Invention

The present invention relates generally to apparatus for holding cutting tools used with multi-spindle machines, and more particularly, but not by way of limitation, to a toolholder apparatus designed for use with a parting tool.

2. Description of the Prior Art

A multi-spindle machine includes a plurality of rotating spindles. A workpiece is mounted in each spindle. The workpiece is rotated by the spindle, and is engaged by a variety of cutting tools to shape the rotating workpiece into a final part.

The various cutting tools are mounted in very rugged holding devices which are bolted to a supporting surface of a tool slide of the machine.

As each spindle of the multi-spindle machine is indexed to the various operating positions of the machine, the tool slide associated with that respective position is advanced toward the rotating workpiece to engage a cutting tool with the workpiece.

As will be appreciated by those skilled in the art, the adjustment of the position of the cutting tool relative to the rotating workpiece is critical to achieving the desired finished cut on the workpiece. Because the tool slide advances to a predetermined position relative to the spindle, this adjustment must be made by first adjusting the position of the cutting tool relative to the tool slide upon which it is mounted.

Another operational difficulty that is encountered when using such a machine is the replacement of a cutting tool insert when the existing cutting tool insert has become worn or broken. The space which is available around the tool slide area of the multi-spindle machine is very limited.

Thus it is seen that there is a need in the art for an adjustable toolholder which allows easy removal and replacement of the cutting tool insert without modification or readjustment of the position adjustments of the toolholder.

SUMMARY OF THE INVENTION

The present invention provides a toolholder apparatus for holding a cutting tool adjacent a workpiece having a rotational axis. The toolholder apparatus includes a mounting block base and a mounting block body, slidably supported from the base. A first adjustable connector connects the body and the base so that a position of the body on the base can be adjusted in a first direction toward the workpiece. A center adjustment block slidably engages the body. A second adjustable connector connects the center adjustment block and the body so that a position of the center adjustment block on the body can be adjusted in a second direction transverse to the first direction and the transverse to the rotational axis of the workpiece. A head is detachably mounted on the center adjustment block, the head being removable from the center adjustment block by sliding movement in a third direction transverse to both of the first and second directions. A cutting tool support is attached to the head, so that the head and the cutting tool may be removed from the apparatus to replace the cutting tool, and then the head and the replacement cutting tool may be remounted on the apparatus without having modified the position of the cutting tool relative to the mounting block base and thus relative to the rotating workpiece.

The apparatus of the present invention may also be described as a cut off tool apparatus for cutting off a part from a rotating workpiece, the apparatus including a parting tool insert, a clamp for holding the parting tool insert, a head, the clamp being attached to the head, a mounting block assembly for mounting the apparatus on a tool slide, and a means for removably mounting the head on the mounting block assembly so that the head and the parting tool insert have a fixed position relative to the mounting block assembly when mounted thereon and so that the head can be removed from the mounting block assembly by sliding motion in a direction parallel to the axis of rotation of the workpiece.

A method of cutting off a part from a rotating workpiece is disclosed which includes steps of providing a mounting block assembly and a head, clamping a parting tool in place on the head, sliding a tongue defined on one of the head and the mounting block assembly into a groove defined in the other of the head and the mounting block assembly, during the sliding motion abutting the head against a stop surface to define a fully engaged position of the head and the mounting block assembly, releasably locking the head in the fully engaged position relative to the mounting block assembly, and moving the parting tool into engagement with the rotating workpiece and cutting off the part from the rotating workpiece.

Another method of mounting a cutting tool on the toolholder includes:

a. providing a mounting block and a head;
b. supporting the cutting tool on the head;
c. sliding a protrusion defined on one of the head and the mounting block into a recess defined in the other of the head and the mounting block;
d. during the sliding motion, abutting the protrusion against a stop to define a fully engaged position of the head and the mounting block;
e. adjusting a proximity of the mounting block and the cutting tool relative to a workpiece; and
f. adjusting a height of the cutting tool relative to the workpiece.

It is therefore a general object of the present invention to provide an improved toolholder apparatus for holding a cutting tool adjacent a rotating workpiece.

Another object of the present invention is the provision of a toolholder apparatus which allows a head which carries the cutting tool to be readily removed and replaced.

Still another object of the present invention is the provision of an apparatus which allows the removal and replacement of the head by sliding motion of the head in a direction parallel to the rotational axis of the workpiece.

Still another object of the present invention is the provision of a toolholder apparatus with a removable head, and having a proximity adjustment means and a height adjustment means for adjusting the proximity and height of the cutting tool relative to the rotating workpiece.

And another object of the present invention is the provision of methods of cutting off a part from a rotating workpiece.

Still another object of the present invention is the provision of methods of mounting a cutting tool on a toolholder in such a manner that the proximity and height of the cutting tool relative to a workpiece may be adjusted, and so that a head which carries the workpiece may be detachably mounted on the holder.

Numerous other objects features and advantages of the present invention will be readily apparent to those skilled in

BRIEF DESCRIPTION OF THE DRAWINGS

FIG. 2 is a side elevation view of the toolholder apparatus of FIG. 1.

FIG. 3 is a top plan view of the toolholder apparatus of FIG. 2.

FIG. 4 is a left end elevation view of the toolholder apparatus of FIG. 2.

FIG. 5 is a left-end elevation view of the mounting block base of the apparatus of FIG. 2.

FIG. 6 is a bottom view of the center adjustment block at the apparatus of FIG. 2.

DETAILED DESCRIPTION OF THE PREFERRED EMBODIMENTS

Figure 1:
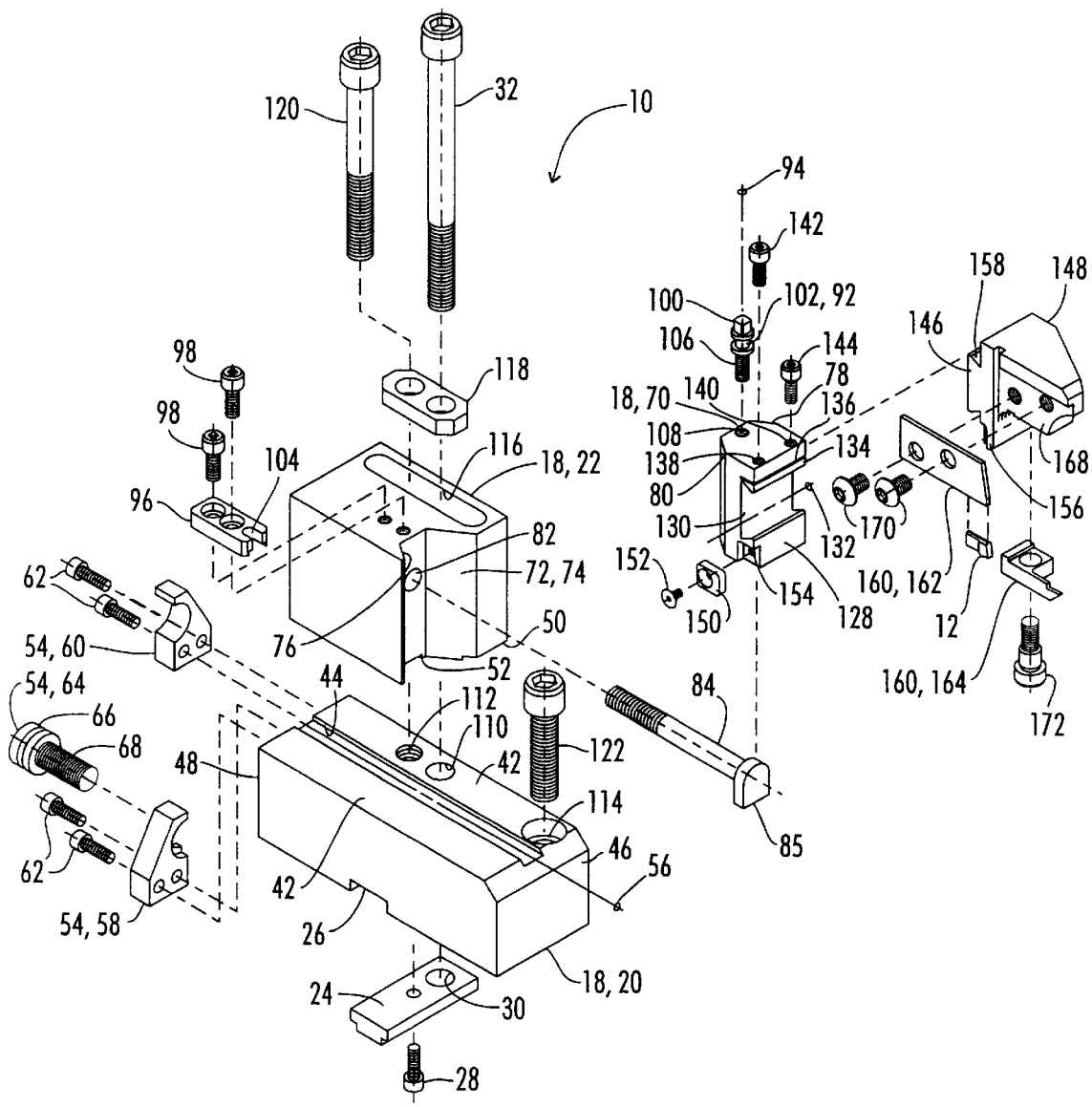
FIG. 1 is an exploded perspective view of the toolholder apparatus.

Referring now to FIG. 1, the toolholder apparatus of the present invention is shown and generally designated by the numeral 10. As best seen in FIG. 2, the apparatus 10 is an apparatus for holding a cutting tool insert 12 adjacent a rotating workpiece 14. In FIG. 2, the rotating workpiece 14 is shown as a circular object in broken lines. As will be understood by those skilled in the art, the rotating workpiece 14 is an elongated member which is held in a rotating spindle of the multi-spindle machine tool. A segment of the rotating workpiece 14 is shaped, and then that segment is cut off from the remainder of the workpiece by moving a parting tool such as the parting tool insert 12 into engagement with the rotating workpiece 14 to sever a segment of the same away from the remainder of the rotating workpiece. The rotating workpiece 14 has a rotational axis 16 which is best seen in the plan view of FIG. 3.

The apparatus 10 includes a mounting block assembly 18, which is made up of a mounting block base 20 and a mounting block body 22 slidably supported from the base. The mounting block base has a mounting key 24 which is received in a downwardly open groove 26 thereof. The key 24 is held in place relative to the base 26 by a machine screw 28.

The key 26 includes a mounting bolt bore 30 defined vertically there through which will receive the mounting bolt 32 for attachment to a T-shaped nut 34 which is received within a mounting groove 36 of a tool slide 38 so as to mount the apparatus 10 on the surface 40 of the tool slide in a conventional manner.

The mounting block base 20 has a planar top surface 42 defined thereon which is divided by a linear groove 44 which extends from a front end 46 to a rear end 48 of the mounting block base 20.

The mounting block body 22 includes a bottom planar surface 50 which rests upon and is slidable upon the top planar surface 42 of mounting block base 20.

The mounting block body 22 has a downwardly protruding tongue or rib or protrusion 52 which is best seen in FIG. 5 and which is slidably received in the groove 44 of mounting block base 20.

A first adjustable connector 54 connects the mounting block body 22 to the mounting block base 20 so that a position of the mounting block body 22 on the mounting block base 20 can be adjusted linearly in a first direction aligned along a central axis 56 running down the center of the groove 44.

The first adjustable connector 56 includes first and second adjustment screw retainer halves 58 and 60 which are attached to mounting block body 20 by a plurality of machine screws 62. The first adjustable connector 54 includes a first dial screw or micrometer screw 64 which is held in place by the retainer halves 58 and 60.

The micrometer screw 64 includes a head 66 which is grasped between the retainer halves 58 and 60 so that the screw 64 can rotate relative to the mounting block base 20, but cannot move linearly in the direction of the axis 56. The micrometer screw 64 further includes a threaded portion 68 which is received in a threaded bore 69 (See FIG. 5) in the rear end of the mounting block body 22. Thus, as the micrometer screw 62 is rotated it will cause the mounting block body 22 to be translated linearly relative to the mounting block base 20 along the first direction 56.

The apparatus 10 further includes a center adjustment block 70 which is slidably engaged with the mounting block body 22.

The mounting block body 22 has a vertically elongated tapered recess 72 defined in its forward face. The recess 72 has two inwardly tapered walls 74 and 76.

The center adjustment block 70 includes two tapered outer surfaces 78 and 80 which are complementary to and engage the tapered walls 74 and 76 of mounting block body 22.

The mounting block body 22 includes a horizontal bore 82 there through. A draw bar 84 is received through the bore 82 and has an enlarged tongue 86 defined on the forward end thereof.

A bottom view of the center adjustment block 70 is shown in FIG. 6. There it can be seen that a T-shaped groove 86 extends upwardly vertically into the center adjustment block 70 from a bottom surface 88 of the center adjustment block 70. The head or tongue 85 of draw bar 84 is slidably received in the T-shaped groove 86 of center adjustment block 70 so that the center adjustment block 70 can slide vertically relative to the draw bar 84 and the mounting block body 22.

A center adjustment screw retainer 96 is attached to the top surface of body 22 by a pair of machine screws 98. A center adjustment screw 100 has an upper spool portion 102 which is rotatably received within a yoke 104 of retainer 96, so that as center adjustment screw 100 is rotated, the threaded engagement of threaded portion 106 of center adjustment screw 100 with a threaded vertical bore 108 extending into the top surface of center adjustment block 70, allows the vertical position of center adjustment block 70 relative to mounting block body 22 to be adjusted along a second direction or second axis 94. When the vertical position of center adjustment block 70 relative to mounting block body 22 has been adjusted to the desired location, the mounting block body 70 is clamped into fixed position relative to the mounting block body 22 by tightening a nut 90 on the rear end of the draw bar 84 to pull the tapered surfaces 78 and 80 of center adjustment block 70 into tight wedging engagement with the inwardly tapered wall 74 and 76 of the mounting block body 22.

Thus, the inwardly tapered walls 74 and 76, draw bar 84 with its head 85, the groove 86, and the center adjustment screw 100, all collectively provide a second adjustable connector 92 connecting the center adjustment block 70 and the mounting block body 22 so that a position of the center adjustment block 70 on the body 22 can be adjusted in a vertical second direction generally designated by the directional arrows 94 in FIG. 1, which second direction 94 is transverse to the first direction 56 and transverse to the rotational axis 16 of the workpiece.

Although the relative orientation of directions 56 and 94 and axis 16 are generally described as transverse, more particularly, it is preferred that direction 94 be perpendicular to direction 56 and that both directions 94 and 56 be perpendicular to the rotational axis 16.

The mounting block base 20 has a first cylindrical vertical bore 110 there through which receives the mounting bolt 32 which was previously described. The base 20 also includes two other threaded vertical bores 112 and 114.

The mounting block body 22 includes an elongated vertical slot 116 extending downwardly therethrough and superpositioned above bores 110 and 112.

A washer plate 118 fits over slot 116 and the mounting bolt 32 and a fastener bolt 120 extend downwardly through the washer plate 118 and slot 116.

The fastener bolt 120 threads into the threaded bore 112 of mounting block base 20 so that the longitudinal position of mounting block body 22 upon mounting block base 20 can be locked in place after adjustment thereof with the first adjustable connecting means 54.

A tool slide locking bolt 122 extends downward through the third bore 114 of mounting block base 20 to engage another T-shaped locking nut 124 in another T-shaped groove 126 of the tool slide 38 in a conventional manner. (See FIG. 2).

The center adjustment block 70 has a forward face 128 which has a dovetail shaped groove 130 defined therein and oriented along a third direction 132. The third direction 132 is generally parallel to the rotational axis 16 and generally perpendicular to the first and second directions 56 and 94.

The dovetail shaped groove 130 has an upper lip 134 adjacent which has been cut an elongated slot 136 which effectively allows the lip 134 to be a somewhat flexible cantilevered member.

The center adjustment block 70 has two vertical threaded bores 138 and 140 defined therein extending downwardly to the slot 134. A pair of locking screws 142 and 144 are received through bores 138 and 140 and may be threaded downward into engagement with the cantilevered lip 134 to lock the same to a complementary dovetail shaped tongue 146 of head 148 in a manner further described below.

Adjacent one end of dovetail shaped groove 130 a stop plate 150 is attached to center adjustment block 70 by a screw 152 received within a threaded bore 154. An abutment surface 156 is defined on the head 148 to define the fully engaged position of the head 148 when it is assembled with the center adjustment block 70.

The head 148 is detachably mounted on the center adjustment block 70 by means of the complementary shaped dovetail tongue 148 and dovetail groove 130 just described. The head 148 can be removed from the center adjustment block 70 by sliding movement in the third direction 132.

To mount the head 148 on the center adjustment block 70, the dovetail shaped tongue 146 is slid into the groove 130 in a direction from right to left along the line 132 as seen in FIG. 1, until the abutment surface 156 abuts stop plate 150 thus defining the fully engaged position of head 148 with center adjustment block 70. Then, the lock screws 142 and 144 are tightened to push downward on the cantilevered lip 134 which will tightly engage the upper edge 158 of the dovetail shaped tongue 146 thus preventing any further sliding movement of head 148 relative to center adjustment block 70.

The head 148 carries the cutting tool insert 12 which is mounted as follows. A cutting tool support assembly 160 includes a blade 162 and a clamp 164. The blade 162 which may be described as a support blade 162 is removably attached to a planar support surface 168 of head 148 by a plurality of screws 170. The clamp 164 is removably attached to the head 148 by means of a clamp connecting screw 172 so that the cutting tool insert 12 may be clamped between the support blade 162 and the clamp 164 as is best seen in FIG. 2.

It will be appreciated by those skilled in the art that other types of cutting tool support assemblies may be substituted for assembly 160, so that other standard designs of cutting tool inserts can be mounted on head 148.

In a preferred embodiment of the invention the cutting tool insert 12 is a parting tool which is designed to make the final cut which parts one segment of the rotating workpiece from the remaining longer portion of the rotating workpiece which is still held in place within the spindle of the machine tool. It will be appreciated, however, that with some modification of the head assembly 148 other types of cutting tools such as a shave tool or form tool could be carried by the apparatus 10.

The dovetail shaped complementary tongue 146 and groove 130 along with stop plate 150 and the lock screws 142 and 144 collectively provide a means for removably mounting the head 148 on the mounting block assembly 18 so that the head 148 and thus the parting tool insert 12 have a fixed position relative to the mounting block assembly 18 when mounted thereon so that the head 148 can be removed from the mounting block assembly 18 by sliding motion in the direction 132 which is generally parallel to the axis of rotation 16 of the workpiece 14.

METHODS

The apparatus 10 is generally utilized in the following manner to mount a cutting tool 12 and to use the cutting tool 12 to cut a segment of a rotating workpiece 14 off of the remainder of the workpiece, thus performing the parting function.

A mounting block assembly such as 18 is provided. The mounting block assembly 18 is fixedly mounted on the tool slide 38 by the bolts 32 and 122 which engage the T-shaped nuts 34 and 124 engaging T-shaped cross-section grooves 36 and 126 in the tool slide 38 as is shown in FIG. 2. Thus the position of the mounting block base 18 is fixed relative to the tool slide 40. As will be understood by those skilled in the art, upon operation of this apparatus the tool slide 40 physically moves toward the rotating workpiece 14 to move the cutting tool 12 into engagement with the rotating workpiece 14. To adjust the position at which the cutting tool 12 will engage the rotating workpiece 14, the position of the cutting tool insert 12 relative to the mounting block base 20 must be adjusted. This is provided by the various apparatus previously described.

First, the position of the cutting tool insert 12 relative to the center adjustment block 70 is determined by clamping the cutting tool 12 in place on the head 148, and then sliding the dovetail shaped tongue 146 of head 148 into the groove 130 on the center adjustment block 70 until the surface 156 abuts stop plate 150 thus defining a fully engaged position of the head 148 with the center adjustment block 70. The head 148 is releasably locked in this fully engaged position by tightening the set screws 142 and 144.

It is noted that the center adjustment block 70 may be considered to be a portion of the mounting block assembly 18.

The proximity between the cutting tool insert 12 and the rotating workpiece 14 may be adjusted by adjusting a position of the mounting block body 22 and center adjustment block 70 and head 148 all relative to the workpiece 14 by sliding all of those structures in the direction 56 toward the workpiece 14. This is accomplished by rotating the micrometer screw 64. When the desired position in direction 56 is attained, the mounting block body 22 is locked in place relative to the mounting block base 20 by tightening lock bolt 120.

Also, the height of the cutting tool insert 12 relative to the workpiece 14 may be adjusted by rotating the center adjustment screw 102 which will cause the center adjustment block 70 to slide upwardly or downwardly within the tapered recess 72 of mounting block body 22. When the desired vertical adjustment is attained, the center adjusting block 70 is fixed relative to mounting block body 22 by tightening the nut 90 on draw bar 94 so that the center adjustment block 70 will tightly wedge within the tapered walls 74 and 76 of recess 72.

Once all of the adjustments have been properly made so that the cutting tool insert 12 is functioning in the desired manner when the apparatus 10 is moved by tool slide 38 into engagement with the workpiece 14, it will sometimes be desired to replace the cutting tool insert 12 as it becomes worn or broken.

With the apparatus and methods of the present invention, the insert 12 may be replaced without changing either the proximity adjustment or height adjustment just described.

This changing of the insert 12 is accomplished by loosening the set screws 142 and 144, sliding the head 148 out of engagement with the center adjustment block 70, replacing the insert 12 with a replacement insert, and then returning the head 148 to its fully engaged position wherein surface 156 abuts stop plate 150 and then re-tightening the set screws 142 and 144. Thus the replacement insert will now be in exactly the same location as was the original insert 12.

It is noted that this construction allows the head 148 with the cutting tool insert 12 to be removed by sliding motion in a direction parallel to the rotational axis of the workpiece. It is noted that removal of the head in this direction is preferred because of the limited clearances which are present around the cutting tool head which make it more difficult to remove the head by motion in the first direction 56 or second direction 94.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A toolholder apparatus for holding a cutting tool adjacent a workpiece having a rotational axis, comprising:

a mounting block base adapted to be supported from a tool slide;

a mounting block body slidably supported from the base;

a first adjustable connector connecting the body and the base so that a position of the body on the base is adjustable in a first direction toward the workpiece upon rotation of the first adjustable connector;

a center adjustment block slidably engaging the body;

a second adjustable connector connecting the center adjustment block and the body so that a position of the center adjustment block on the body is adjustable in a second direction transverse to the first direction and transverse to the rotational axis of the workpiece;

a head, detachably mounted on the center adjustment block, the head being removable from the center adjustment block by sliding movement in a third direction transverse to both of the first and second directions; and a cutting tool support attached to the head, so that the head and the cutting tool are removable from the apparatus to replace the cutting tool and then the head and the replacement cutting tool may be remounted on the apparatus.

2. The apparatus of claim 1, wherein:

the center adjustment block has a groove defined therein parallel to and defining the third direction;

the head has a tongue defined thereon which is slideably received in the groove of the center adjustment block;

and the apparatus further includes:

a stop, defined on one of the center adjustment block and the head, to positively define a fully engaged position of the tongue in the groove; and a lock which locks the tongue and groove in their fully engaged position.

3. The apparatus of claim 2, wherein:

the groove of the center adjustment block and the tongue of the head are complementary dovetail shapes.

4. The apparatus of claim 2, wherein:

the stop comprises a stop plate attached to the center adjustment block.

5. The apparatus of claim 2, wherein:

the lock comprises a set screw.

6. The apparatus of claim 1, wherein:

the head has a planar support surface defined thereon; and the cutting tool support includes:

a support blade engaging and removably attached to the support surface of the head; and a clamp removably attached to the head so that the cutting tool may be clamped between the support blade and the clamp.

7. The apparatus of claim 1, wherein:

the body has an elongated recess defined therein with inwardly tapered walls, the recess being elongated in the second direction;

the center adjustment block includes two tapered outer surfaces, complementary to and engaging the tapered walls of the body; and the apparatus further includes a drawbar extending through the body and engaging the center adjustment block so that a position of the center adjustment block relative to the body can be fixed by drawing the tapered outer surfaces of the center adjustment block into wedging engagement with the inwardly tapered walls of the body.

8. The apparatus of claim 1 further comprising:

the cutting tool, wherein the cutting tool is a parting tool.

* * * * *